March 25, 1958
C. R. DA VATZ
2,828,143
REAR AXLE HOUSING SUPPORTED LOAD EQUALIZING TRAILER HITCH
Filed April 26, 1957
2 Sheets-Sheet 1
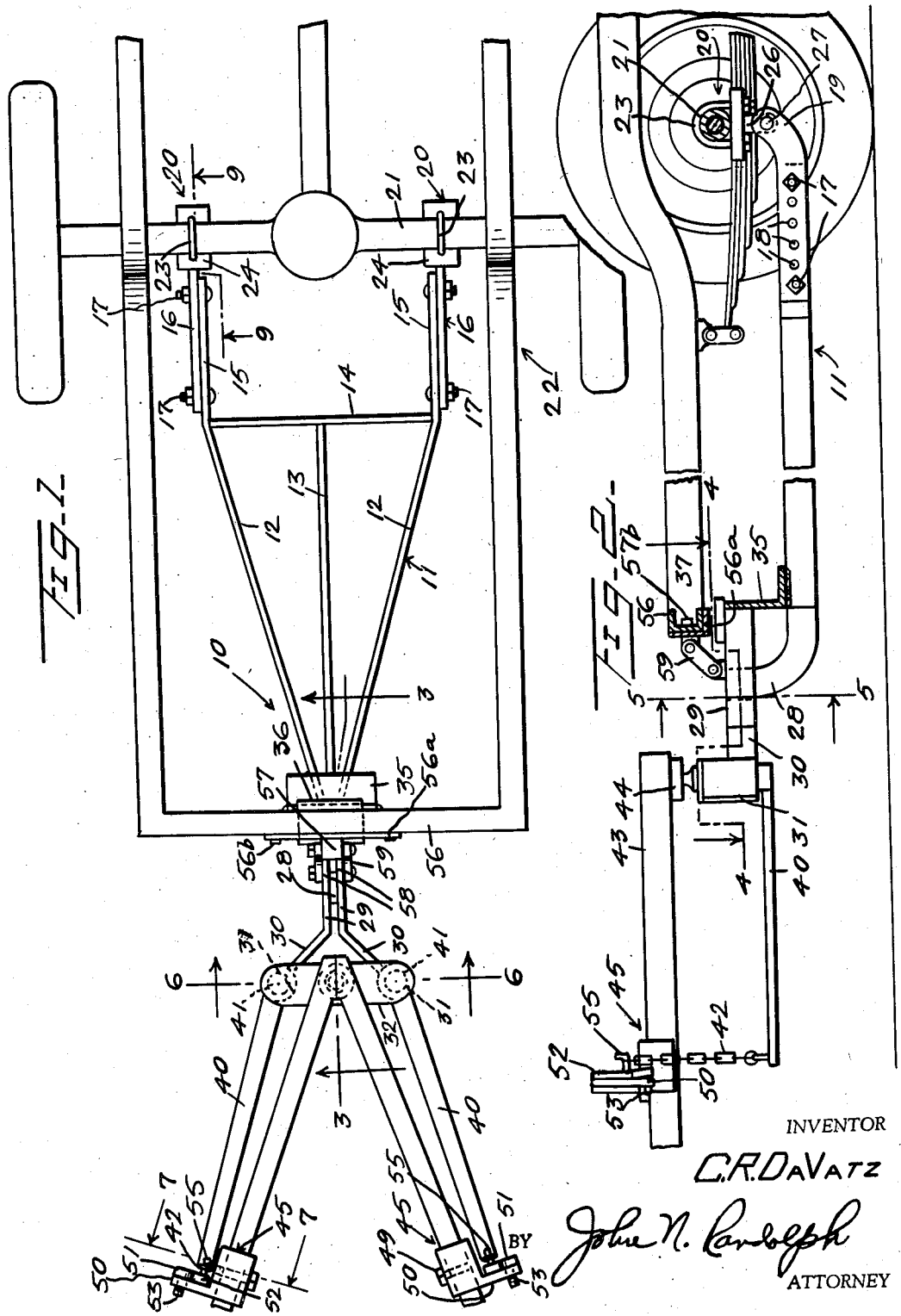
INVENTOR
C.R.DaVatz
BY John N. Randolph
ATTORNEY

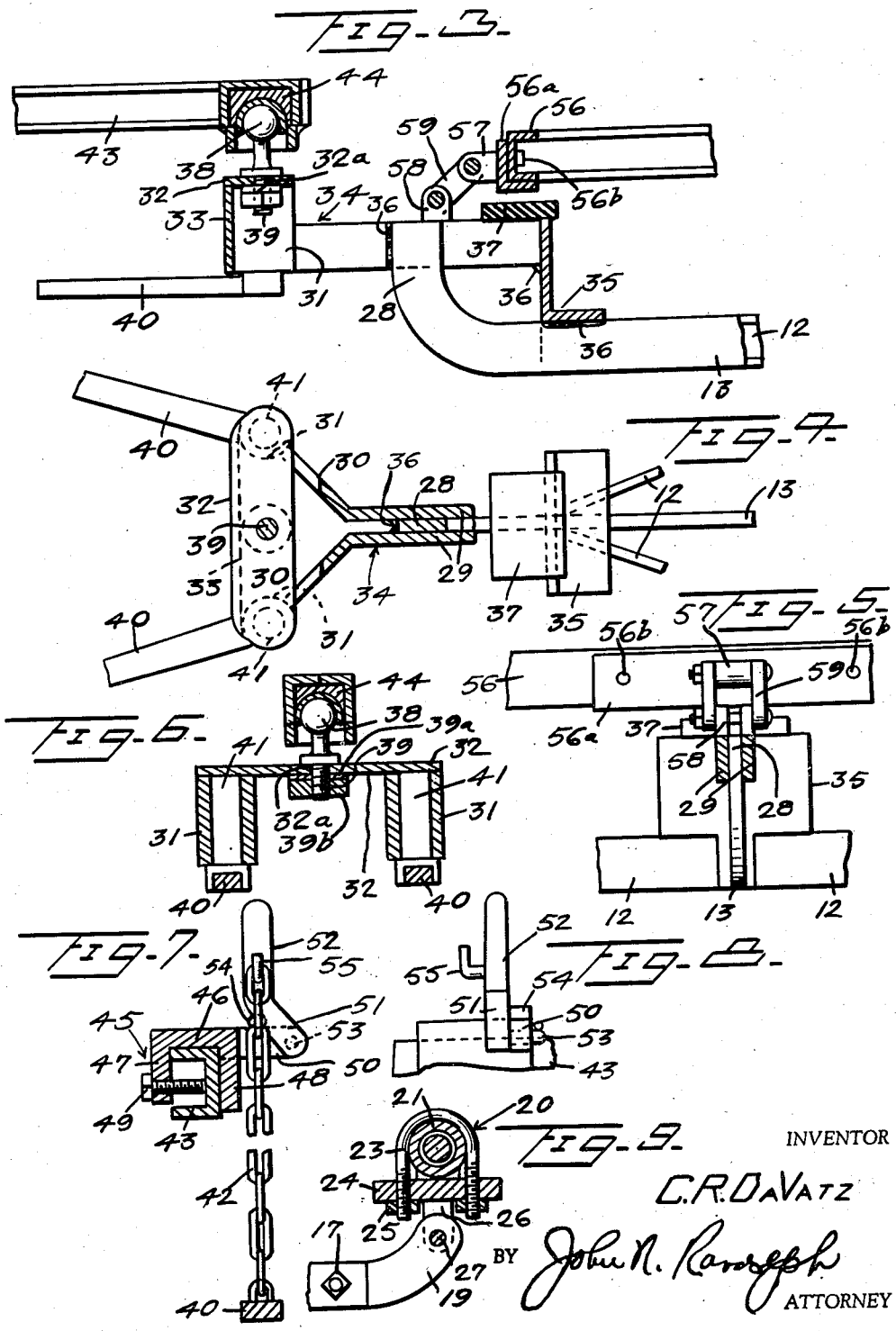

United States Patent Office 2,828,143
Patented Mar. 25, 1958

2,828,143

REAR AXLE HOUSING SUPPORTED LOAD EQUALIZING TRAILER HITCH

Christian R. Da Vatz, Hot Springs National Park, Ark.

Application April 26, 1957, Serial No. 655,312

2 Claims. (Cl. 280—406)

This invention relates to a novel trailer hitch especially adapted for use in coupling a trailer, such as a house trailer to an automobile, and has for its primary object to provide a novel hitch structure which is supported by and pulled from the rear axle housing of the automobile to relieve the rear end of the vehicle frame from the load normally borne by the trailer hitch so that the use of overload springs will not be required.

More particularly, it is an aim of the present invention to provide a novel spring suspension for bridging the coupling connecting the trailer hitch to the trailer tongue and by means of which the trailer tongue and hitch can be supported at desired elevations.

Various other objects and advantages of the invention will hereinafter become more fully apparent from the following description of the drawings, illustrating a presently preferred embodiment thereof, and wherein:

Figure 1 is a top plan view showing the trailer hitch in an applied position;

Figure 2 is a fragmentary side elevational view, partly in section thereof;

Figure 3 is an enlarged fragmentary longitudinal sectional view, taken substantially along a plane as indicated by the line 3—3 of Figure 1;

Figure 4 is an enlarged horizontal sectional view, taken substantially along a plane as indicated by the line 4—4 of Figure 2;

Figure 5 is an enlarged fragmentary cross sectional view, taken substantially along a plane as indicated by the line 5—5 of Figure 2;

Figures 6 and 7 are enlarged fragmentary cross sectional views, taken substantially along planes as indicated by the lines 6—6 and 7—7, respectively, of Figure 1;

Figure 8 is a fragmentary side elevational view looking toward the outer side of a part of the trailer hitch, in a direction from right to left of Figure 7, and Figure 9 is an enlarged sectional view, taken substantially along a plane as indicated by the line 9—9 of Figure 1.

Referring more specifically to the drawings, the rear axle housing supported trailer hitch in its entirety and comprising the invention is designated generally 10 and includes an elongated frame 11, constituting the draft member of the trailer hitch.

The frame 11 includes rearwardly converging corresponding side members 12 the merging rear ends of which are disposed against and suitably secured to opposite sides of a central bar 13 of the frame 11. A forward portion of the bar 13 is disposed midway between the rearwardly converging side members 12 and has its forward end secured to an intermediate portion of a rigid cross brace 14 of the frame 11. The side members 12 have corresponding substantially parallel forward ends 15 which are laterally spaced relative to one another. The ends of the cross brace 14 are secured to the frame portions 15 where said portions merge with the converging portions 12, as seen in Figure 1. The forward end of the frame 11 is formed by two corresponding bars 16, rear end portions of which overlap the frame portions 15 and are secured thereto by nut and bolt fastenings 17. The frame portions 15 and bars 16 have corresponding longitudinally spaced openings 18 for receiving the fastenings 17 and by means of which the bars 16 can be extended relative to the portions 15 for varying the length of the frame 11. The other forward ends 19 of the bars 16 are curved upwardly, as seen in Figures 2 and 9.

A pair of clamps, each designated generally 20, are adjustably secured to the rear axle housing 21 of an automobile, a part of which is illustrated in the drawings and designated generally 22. As best seen in Figure 9, each clamp 20 includes a U-bolt 23 which engages over a part of the axle housing 21 and the threaded ends of which extend downwardly through openings in a bottom plate 24. Nuts 25 engage the bolt ends and are tightened against the underside of the plate 24 for clamping said plate tightly against the underside of the axle housing 21. A bifurcated lug 26 is fixed to and extends downwardly from the plate 24 to loosely receive the terminal part of one of the upturned bar ends 19 which is pivotally connected to the clamp 20 by a fastening, such as a pin or bolt 27, which extends through the furcations of the lug 26 and loosely through the bar end 19. Thus, the frame 11 is pivotally supported by the clamps 20 beneath the axle housing 21.

The other rear end of the center bar 13 of the frame extends to beyond the rear ends of the frame sides 12 and has an upturned terminal 28 the upper portion of which is secured between intermediate portions of two bars 29. The bar portions 29 are disposed substantially parallel to one another and have divergent rear end portions 30 which are secured to laterally spaced sleeves 31. The sleeves 31 are connected by a horizontal top web 32 and a rear vertical web 33. The top web 32 has an opening 32a disposed midway between the sleeves 31. The parts 29 to 33 comprise the coupler head, designated generally 34.

As best seen in Figures 3 and 4, an L-shaped brace 35 has a short leg which is disposed on and secured to the frame 11 and an upstanding longer leg, against which the forward ends of the bar portions 29 engage and to which said bar ends are secured. The brace 35 is preferably secured by welding as indicated at 36 to the frame 11 and bar portions 29 and said bar portions 29 are also preferably welded to the upstanding bar end 28 by additional welds 36. A rubber cushioning member 37 is secured to portions of the upper edges of the bar portions 29 and to the upper edge of the brace 35.

A ball 38 of a ball and socket coupling is supported by and extends upwardly from the web 32 and has a depending threaded stem 39 which extends downwardly through the web opening 32a and is secured to the web 32 by a lock washer 39a and a nut 39b.

A pair of elongated bars 40, formed of spring steel or other resilient material, have corresponding upturned forward ends 41 which project upwardly into the sleeves 31 and which may be suitably retained therein as by frictional engagement between the parts. Said forward ends or stems 41 turnably engaging in the sleeves 31 for swinging movement of the bars 40 relative to the coupler head 34. The springs 40 extend rearwardly from the sleeves 31 in diverging relation to one another. Chains 42 are connected to the opposite rear ends of the springs 40.

The forward end of a trailer frame is illustrated in Figures 1 to 3 and comprises forwardly converging frame members 43 which form a trailer tongue and which have merging forward ends in which is secured a downwardly opening socket 44 which is adapted to fit over the ball 38 and to combine therewith to form a ball and socket coupling 38, 44 for connecting the trailer frame to the trailer hitch. The frame members 43 preferably comprise inwardly opening channels, as best seen in Figures 3 and 7.

A saddle member 45 is detachably mounted on each frame member 43. Each saddle member 45 includes a top wall 46 which rests on the top of the frame member 43, an inner side wall 47 and an outer side wall 48 which closely straddle the inner and outer sides, respectively, of the frame member. A clamping bolt 49 is threaded inwardly through the inner wall 47 and is tightened against a part of the frame member 43 for securing the saddle 45 thereon. A rigid lug 50 is fixed to and extends outwardly from a portion of the outer wall 48 of each saddle 45. A lever composed of a lower portion 51 and an upper portion 52 is swingably supported by each lug 50. The lever portions 51 and 52 form an oblique angle with one another and the lever portion 51, near its distal end, has a laterally projecting stem 53 which extends through and is journalled in the outer portion of the lug 50 for mounting the lever 51, 52 for swinging movement in a plane parallel to the lug 50. The lever portion 51, on the inner side thereof which faces the lug 50, is provided with a rigid protuberance 54 which is spaced from the stem 53. The opposite side of the lever portion 52 has an upwardly opening hook 55 fixed thereto which is spaced from the upper or outer end of the lever portion 52. With the ball 38 engaging in the socket 44, the levers 51, 52 may be swung outwardly and downwardly after which selected links of the two chains 42 are engaged with the hooks 55, for connecting the levers to the springs 40 which are disposed therebeneath. The levers 51, 52 are then swung upwardly and inwardly with respect to the saddles 45 and frame members 43. During this movement the hooks 55 will move across positions directly above the stems 53 and the chains 42 will be swung inwardly by the hooks 55 so as to pass inwardly across the stems 53, after which the protuberances 54 will move into engagement with the upper surfaces of the lugs 50 to prevent further inward swinging movement of said levers and so that the levers will then be in the positions as shown in Figures 1 and 7. The aforedescribed movement of the levers 51, 52 will cause the chains 42 to exert upward pulls on the rear free ends of the springs 40 to place said springs under tension and so that the springs 40 will then function to yieldably support the rear end of the hitch 10 and the forward end of the trailer frame which is coupled thereto, since any tendency of the coupled parts to swing downwardly will cause an additional upward pull to be exerted on the springs 40 to further tension said springs. The spring ends 41 are capable of turning in the sleeve members 31 so that the hitch can swing relative to the trailer, as for example, when the automobile 22 is negotiating a turn. It will also be apparent that the chains 42 may be adjustably connected to the hooks 55 so as to vary the tension which is applied to the supporting springs 40. Furthermore, the coupler head 34 is constructed as a unit so that it can be secured to the frame 11 to position the sleeve members 31 at a slight incline, if desired, rather than in upright positions, to vary the tension which will normally be imposed upon the springs 40. By these adjustments the height of the trailer tongue and trailer hitch may be varied and the trailer hitch may be adjusted to accommodate different loads. From the foregoing it will be apparent that the weight of the forward end of the trailer which is normally supported by the rear end of the vehicle frame is supported by the rear axle housing 21 where the hitch 10 is utilized.

As seen in Figures 1 to 3, the forward portions of the bars 29 are adapted to be disposed directly beneath the rear cross member 56 of the frame or chassis of the vehicle 22 and the bumper pad 37 is provided to strike the frame portion 56 should the trailer hitch 10 swing upwardly to any appreciable extent above its normal position as seen in Figures 2 and 3.

A piece of angle iron 56a is secured to the rear frame portion 56 by nut and bolt fastenings 56b and is provided with a rearwardly projecting lug 57 which is disposed above the bar portions 29. Said bar portions 29 are provided with upstanding lugs 58 which are disposed rearwardly respect to the pad 37. The lugs 57 and 58 are detachably connected by a shackle member 59 which supports the trailer hitch 10 at the rear end thereof when the trailer hitch is disconnected from the trailer. The shackle member 59 may also be left connected to the lugs 57 and 58 when the trailer hitch 10 is connected to the trailer. The shackle member will then not support any of the weight of the trailer hitch or trailer, but will reduce up and down movement of the trailer hitch and trailer tongue and will transmit such movement to the vehicle shock absorbers which thus function with the shackle member as a stabilizer.

Various modifications and changes are contemplated and may be resorted to without departing from the function or scope of the invention as hereinafter defined by the appended claims.

I claim as my invention:

1. A trailer hitch comprising an elongated draft member having a forward end and a rear end, means pivotally connected to the forward end of said draft member and adapted to be secured to the rear axle housing of an automobile for pivotally supporting the forward end of the draft member beneath the axle housing for vertical swinging movement of the draft member, said rear end of the draft member being adapted to be disposed beyond the rear end of the automobile frame, a coupling head secured to said rear end of the draft member, a ball coupling supported by and extending upwardly from said coupling head and disposed behind the rear end of the draft member, said ball coupling being adapted to engage in a downwardly opening socket member supported by the forward end of a trailer frame, a pair of elongated spring bars having forward ends, means pivotally connecting said forward ends of the bars to said coupling head, in laterally spaced relation to one another, for horizontal swinging movement of the bars relative to the coupling head, said spring bars extending rearwardly from the coupling head, nonelastic flexible members connected to and extending upwardly from the rear ends of said spring bars, means adapted to be supported by and secured to laterally spaced portions of the trailer frame above the rear ends of said spring bars and to which said flexible members are adjustably connected for placing the spring bars under tension whereby the rear end of the trailer hitch and the forward end of the trailer frame which is coupled thereto are supported by the tensioned spring bars, said means to which said flexible elements are adjustably connected comprising a pair of saddles adapted to be detachably mounted on and secured to laterally spaced portions of the trailer frame, each of said saddles having an outwardly extending rigid lug, a lever swingably mounted on each lug for lateral swinging movement toward and away from the saddle thereof, a hook supported by each lever and spaced from the axis of swinging movement of the lever and to which one of the flexible members is adjustably secured, said hooks being swingable with the levers upwardly and inwardly toward the saddles and across the axes of swinging movement of the levers for causing portions of the flexible members to be moved inwardly across said pivot axes of the levers, and said levers having abutments disposed to engage on upper sides of the lugs to limit downward and inward swinging movement of the levers and for locating the levers in locked positions with said flexible members extending between the saddle members and the lever pivots.

2. A trailer hitch comprising an elongated draft member having a forward end and a rear end, means pivotally connected to the forward end of said draft member and adapted to be secured to the rear axle housing of an automobile for pivotally supporting the forward end of the draft member beneath the axle housing for vertical swinging movement of the draft member, said rear end of the draft member being adapted to be disposed beyond the rear end of the automoble frame, a coupling head secured to said rear end of the draft member, a ball coupling supported by and extending upwardly from said coupling head and disposed behind the rear end of the draft member, said ball coupling being adapted to engage in a downwardly opening socket member supported by the forward end of a trailer frame, a pair of elongated spring bars having forward ends, means pivotally connecting said forward ends of the bars to said coupling head, in laterally spaced relation to one another, for horizontal swinging movement of the bars relative to the coupling head, said spring bars extending rearwardly from the coupling head, nonelastic flexible members connected to and extending upwardly from the rear ends of said spring bars, means adapted to be supported by and secured to laterally spaced portions of the trailer frame above the rear ends of said spring bars and to which said flexible members are adjustably connected for placing the spring bars under tension whereby the rear end of the trailer hitch and the forward end of the trailer frame which is coupled thereto are supported by the tensioned spring bars, a lug adapted to be fixed to and extending rearwardly from the rear portion of the automobile frame and disposed over a part of the coupling head, a lug fixed to and rising from the coupling head, and a shackle member detachably connected to said lugs and combining therewith for supporting the rear end of the trailer hitch when detached from the trailer.

References Cited in the file of this patent

UNITED STATES PATENTS

| | | |
|---|---|---|
| 2,579,657 | Mathisen | May 20, 1952 |
| 2,711,908 | Saxon | June 28, 1955 |
| 2,772,893 | Wettstein | Dec. 4, 1956 |
| 2,793,879 | Bair | May 28, 1957 |